Dec. 30, 1924.
R. M. BIRNBACH
MONUMENT MOLD
Filed Aug. 7, 1924
1,520,849
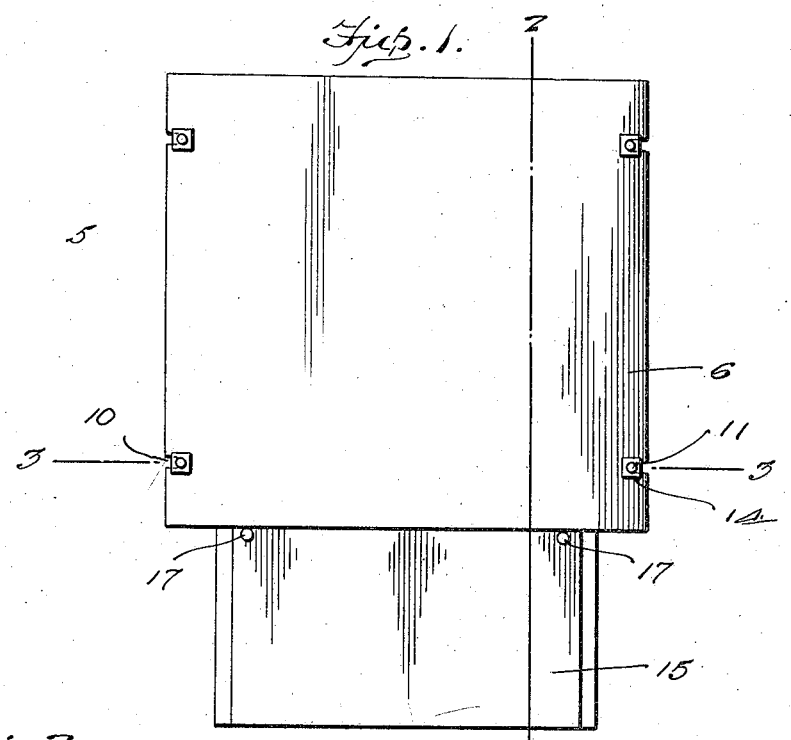
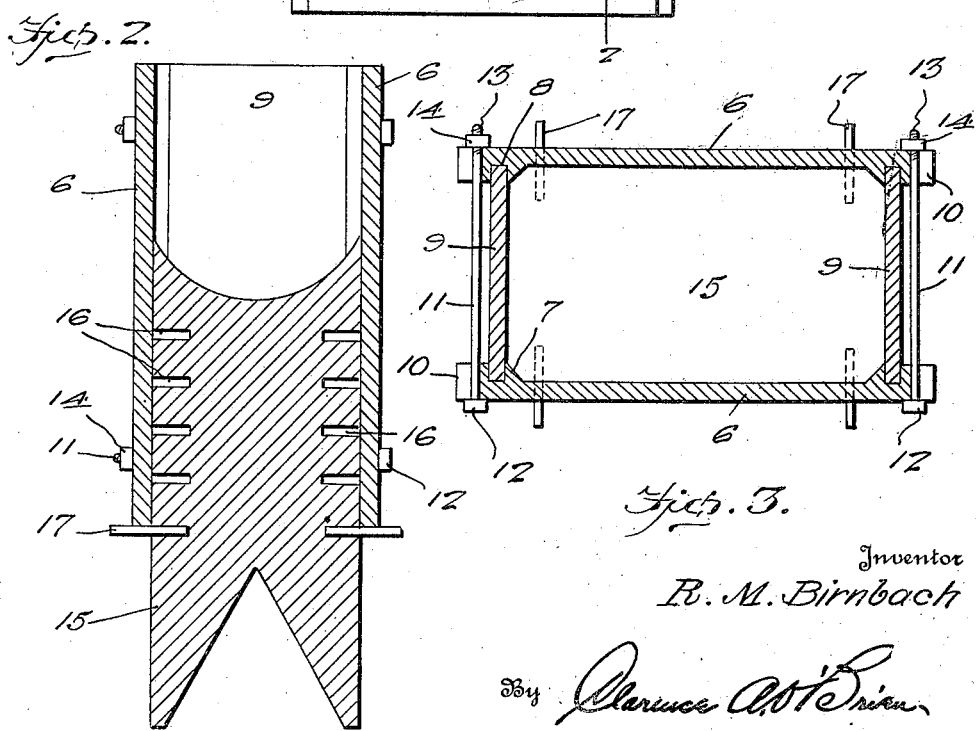
Inventor
R. M. Birnbach
By Clarence A. O'Brien
Attorney Patented Dec. 30, 1924.

1,520,849

UNITED STATES PATENT OFFICE.

RAY M. BIRNBACH, OF LITTLE ROCK, ARKANSAS.

MONUMENT MOLD.

Application filed August 7, 1924. Serial No. 730,647.

*To all whom it may concern:*

Be it known that I, RAY M. BIRNBACH, a citizen of the United States, residing at Little Rock, in the county of Pulaski and State of Arkansas, have invented certain new and useful Improvements in a Monument Mold, of which the following is a specification.

This invention relates generally to the plastic molding art and has more particular reference to a mold wherein monuments, grave markers, etc. may be molded from concrete or other suitable composition in a novel, simple and inexpensive manner wherein the mold may be readily disassembled for cleaning, repair, renewal or shipping purposes.

The primary object of the invention resides in the provision of a mold wherein the same comprises a knock down casing within which is to be disposed a core formed upon opposite edges with different designs whereby the top ends of the monuments or markers may appear with various designs.

A further object of the invention is to provide means whereby the core may be adjustably positioned within the casing for allowing monuments, grave markers, etc., of varying length to be made.

A further and important object of the invention is to provide a mold wherein the same comprises but few parts and these corelated in such a manner as to reduce the possibility of disarrangement of the mold when in use to a minimum.

With the foregoing and other objects in view as the nature of the invention will be better understood the same comprises the novel form, combination and arrangement of parts hereinafter to be more fully described shown in the accompanying drawing and claimed.

In the drawing wherein like reference characters indicate corresponding parts throughout the several views:

Figure 1 is a side elevational view of a mold constructed in accordance with the present invention.

Figure 2 is a detail vertical sectional view taken substantially on the line 2—2 of Figure 1, and Figure 3 is a detail longitudinal sectional view taken substantially on the line 3—3 of Figure 1.

Now having particular reference to the drawing, my novel mold comprises a casing designated generally by the reference character 5, the same including a pair of spaced parallel side walls 6—6 which are preferably of square shape but being of any suitable dimension. At the opposite vertical edges of these side walls the same are formed upon their opposed surfaces with ribs 7 within which are formed vertically extending open ended channels 8 that receive the opposite vertical edges of the end walls 9—9 of desirable width and of a length equivalent to the length of said side walls 6—6.

Adjacent the upper and lower longitudinal edges of the side walls 6—6 and at the vertical edges thereof are spaced notches 10, the notches of said side walls being in alignment with each other for receiving the opposite ends of cross rods 11 certain ends of which are headed at 12 while the opposite ends thereof are screw threaded at 13 for the reception of nuts 14, it being obvious that the heads of the rods engage upon the outer side of one of the side walls 6 while the nuts 14 upon the opposite screw threaded ends of said rods engage upon the outer sides of the remaining side wall. After the rods have been inserted as shown in Figures 1 and 3 the nuts 14 may be tightened for securing the side walls 6—6 in spaced relation, said spaced relation being retained by the provision of the end walls 9.

Adapted for removable positioning within the casing 5 is a core 15 of desirable material, the upper and lower longitudinal edges thereof being formed with any suitable design wherein either longitudinal edge may be employed within the mold for providing a monument or grave marker with a suitable design at the upper end thereof. It being of course also apparent that the inner surfaces of the side and end walls of the mold casing may be provided with a suitable design. This however does not enter into the spirit and scope of the present invention.

The opposite faces of the core 15 are provided with vertical rows of spaced sockets 16 adjacent the opposite end edges thereof for receiving supporting pins 17 upon which the casing 5 rests during use of the mold. It being apparent that in the use of this mold after the casing is set up the pins are inserted in the desired socket after which the casing is slipped over the mold and the concrete then poured into the casing and after the same has become set or hardened the casing may be disassembled for removing the finished product therefrom.

It will thus be seen that I have provided a highly novel, simple and inexpensive form of mold primarily adapted for use in the manufacture of monuments, grave markers, etc., and one I believe that will meet with all the requirements for a successful commercial use.

Having thus described the invention, what I claim as new is:—

In a mold of the character described, a readily knock-down casing open at its upper and lower ends, a core over which the casing is to be partially disposed, means for supporting said casing upon said core, said means comprising detachable laterally extending pins carried by the core and upon which the lower end of the casing is adapted to rest.

In testimony whereof I affix my signature.

RAY M. BIRNBACH.